(12) United States Patent  
Yamamoto (10) Patent No.: US 7,547,145 B2
(45) Date of Patent: Jun. 16, 2009

(54) BEARING DEVICE WITH A SENSOR (75) Inventor: Ken Yamamoto, Iwata (JP)

(73) Assignee: NTN Corporation, Osaka (JP)

(*) Notice: Subject to any disclaimer, the term of this patent is extended or adjusted under 35 U.S.C. 154(b) by 345 days.

(21) Appl. No.: 11/515,942

(22) Filed: Sep. 6, 2006

(65) Prior Publication Data
US 2007/0003177 A1 Jan. 4, 2007

Related U.S. Application Data (63) Continuation-in-part of application No. 10/589,202, filed on Aug. 11, 2006, now abandoned.

(51) Int. Cl.
F16C 19/08 (2006.01)
G01P 3/42 (2006.01)

(52) U.S. Cl. .................. 384/448; 384/173; 384/207.25
(58) Field of Classification Search ......... 384/446–449, 384/537, 544, 548; 324/173–174, 204.22, 324/207.22, 207.25; 310/155
See application file for complete search history.

(56) References Cited

U.S. PATENT DOCUMENTS

| 5,451,869 | A | | 9/1995 | Alff | |
| 5,642,042 | A | * | 6/1997 | Goossens et al. | 324/173 |
| 5,663,640 | A | * | 9/1997 | Sakamoto | 324/207.25 |
| 5,670,874 | A | * | 9/1997 | Miyazaki et al. | 384/448 |
| 5,762,425 | A | * | 6/1998 | Ouchi | 384/448 |
| 6,045,267 | A | * | 4/2000 | Merklein et al. | 384/448 |
| 6,127,819 | A | * | 10/2000 | Ouchi | 324/173 |
| 6,176,622 | B1 | * | 1/2001 | Nicot | 384/448 |
| 6,254,276 | B1 | * | 7/2001 | Ouchi et al. | 384/448 |
| 2003/0218457 | A1 | * | 11/2003 | Aiba et al. | 324/174 |
| 2003/0234578 | A1 | | 12/2003 | Takahashi et al. | |

FOREIGN PATENT DOCUMENTS

| EP | 0 942 186 | 9/1999 |
| EP | 942186 A2 * | 9/1999 |
| EP | 1 008 866 | 6/2000 |

(Continued)

OTHER PUBLICATIONS

Patent Abstracts of Japan, Japanese Publication No. 2003-262645, Published Sep. 19, 2003.

(Continued)

Primary Examiner—Marcus Charles (57) ABSTRACT

To provide a bearing device with the sensor, in which the sensor can be assuredly fitted and which can be employed in bearing parts of varying sized and be economically manufactured, the bearing device with the sensor including a bearing part having an inner member and an outer member includes an encoder of a revolution sensor unit fitted to the inner member and a sensor fitted to one end of the outer member through a sensor mounting member. The sensor mounting member includes a mounting tube part, mounted on the outer member, and a side plate part axially positioned in contact with the outer member. The side plate includes inner and outer opposite plate portions confronting each other, and sandwiching the sensor therebetween. Alternatively, the side plate part may have a recessed plate section swelling outwardly. The sensor mounting member is of a double structure including inner and outer plates.

9 Claims, 7 Drawing Sheets

FOREIGN PATENT DOCUMENTS

| | | | |
|---|---|---|---|
| EP | 1008866 A2 | * | 6/2000 |
| EP | 1 591 765 | | 11/2005 |
| EP | 1591765 A1 | * | 11/2005 |
| JP | 5-213167 | | 8/1993 |
| JP | 05213167 A | * | 8/1993 |
| JP | 09-203742 | | 8/1997 |
| JP | 10-311740 | | 11/1998 |
| JP | 10311740 A | * | 11/1998 |
| JP | 2000-221202 | | 8/2000 |
| JP | 2000-221203 | | 8/2000 |
| JP | 2000-221204 | | 8/2000 |
| JP | 2000-221205 | | 8/2000 |
| JP | 2000221202 A | * | 8/2000 |
| JP | 2000221204 A | * | 8/2000 |
| JP | 2000221205 A | * | 8/2000 |
| JP | 2001-318105 | | 11/2001 |
| JP | 2001318105 A | * | 11/2001 |
| JP | 2003-146196 | | 5/2003 |
| JP | 2003146196 A | * | 5/2003 |
| JP | 2003-254985 | | 9/2003 |

OTHER PUBLICATIONS

Patent Abstracts of Japan, Japanese Publication No. 06-308145, Published Nov. 4, 1994.

Japanese Publication No. JP2003-262645 corresponds to U.S. Patent Publication No. 2003/0234578.

Japanese Publication No. 06 308145 corresponding to U.S. Patent Publication No. 5,451,869.

U.S. Appl. No. 10/382,656, filed Mar. 7, 2003, Toru Takahashi, et al, NTN Corporation.

U.S. Appl. No. 10/589,202, filed Aug. 11, 2006, Ken Yamamoto, NTN Corporation.

International Search Report dated Apr. 19, 2005 in corresponding PCT Patent Application No. PCT/JP2005/001879.

U.S. Office Action, mailed Aug. 18, 2008 and issued in related U.S. Appl. No. 10/589,202.

* cited by examiner

BEARING DEVICE WITH A SENSOR

CROSS REFERENCE TO RELATED APPLICATIONS

The present application is a continuation-in-part of U.S. application Ser. No. 10/589,202, filed Aug. 11, 2006 now abandoned, and claims the benefit of U.S. patent application Ser. No. 10/589,202, filed Aug. 11, 2006, POT International Application Number PCT/JP2005/001879, filed Feb. 9, 2005, and Japanese Application No. 2004-039201, filed Feb. 17, 2004, the disclosures of which are incorporated herein by reference.

BACKGROUND OF THE INVENTION

1. Field of the Invention

The present invention relates to a bearing device with a sensor such as, for example, a wheel support bearing assembly with a revolution sensor for use in an automotive vehicle and in any other field of application.

2. Description of the Prior Art

Wheel support bearing assemblies used in automotive vehicles make use of a revolution sensor for detecting the number of revolutions of a vehicle wheel for the purpose of controlling an anti-lock brake device and any other purpose. The revolution sensor is made up of a magnetic encoder of a ring-shaped configuration fitted to an inner race, which serves as a rotatable raceway member, and a sensor fitted to an outer race, which serves as a stationary raceway member, for detecting the magnetic encoder in a non-contact fashion.

As a first example of configuration for fitting the sensor, the use of a sensor mounting member prepared by pressing a sheet metal has been suggested (See, for example, the Japanese Laid-open Patent Publication No. 6-308145.). This suggested sensor mounting member includes a cutout hole formed in an annular support that is mounted on and, hence, fitted to the outer race, a pair of slide groove forming portions defined on respective side edges of the cutout hole for engagement with side portions of the sensor, and a tongue provided in a lower edge of the cutout hole for urging against a rear face of the sensor.

As a second example of configuration for fitting the sensor, the example is known, in which a retaining member of an arcuate configuration is molded integrally with an outer race mounting tube of an annular configuration mountable on the outer race to form a sensor holder and a sensor element is embedded in the retaining member provided in a portion of this sensor holder (See, for example, the Japanese Laid-open Patent Publication No. 2003-254985).

Although the above described first example of configuration, in which the sensor is inserted in between the slide groove forming portions and is then urged by the tongue has such an advantage as to enable it to be simply mounted, there is a possibility of accidental separation. Also, since the wheel support bearing assembly is placed under the environment tending to be exposed to the road surface, grits and sands are apt to ingress in between the sensor and the magnetic encoder, resulting in the possibility of breakage.

Also, the above described second example of configuration is such that since the retaining member of the sensor holder, in which the sensor element is embedded, and the outer race mounting tube are molded integrally with each other, the sensor holders of varying sizes must be manufactured for each size of the bearing devices with sensors, which vary in size depending on the type of automotive vehicles and the bearing capacity, resulting in increase of the cost.

SUMMARY OF THE INVENTION

An object of the present invention is to provide a bearing device with a sensor, in which the fitting of the sensor is assured and excellent in reliability, and which can be easily applied to bearing parts of different sizes and can be made at a low cost.

A bearing device with a sensor according to the present invention is a bearing device with a sensor, comprising a bearing part including an outer member having a raceway defined in an inner periphery thereof, an inner member having a raceway confronting the raceway in the outer member, and rolling elements interposed between those raceways, and a revolution sensor part including an encoder, fitted to one end of the inner member, and a sensor fitted to one end of the outer member in face-to-face relation with the encoder, wherein the sensor is fitted through the following sensor mounting member.

The sensor mounting member referred to above has a sensor mounting member having a mounting tube part mountable on an outer diametric surface of the outer member and a side plate part axially positioned in contact with an end face of the outer member. The side plate part of the sensor mounting member is provided with inner and outer opposite plate portions confronting with each other, with the sensor being fitted sandwiched between those inner and outer opposite plate portions.

According to this construction, since the sensor is fitted sandwiched between the inner and outer opposite plate portions of the sensor mounting member, the sensor is hardly detached and the fitting can be assured and highly reliable. Since the sensor mounting member is mounted on the outer diametric surface of the outer member through the mounting tube part and is axially positioned in contact with the end face of the outer member through the side plate part, the positioning can be easily and accurately performed, rendering the positioning accuracy of the sensor relative to the encoder to be excellent. Although the sensor referred to above has the sensor element embedded in, for example, a sensor holder made of a resinous material, this sensor holder is manufactured separate from the sensor mounting member and is fitted to the sensor mounting member. For this reason, where fitting is made to the bearing part of a different size, it is sufficient for the sensor mounting member to be complied with the size of the bearing part and the sensor provided with the sensor holder can be used for the different size of the bearing part by the employment of the same element. Accordingly, the sensor unit comprised of the sensor and the sensor mounting member can be manufactured at a low cost.

The side plate part of the sensor mounting member may be provided with a recessed plate section having its inner surface recessed, in which case a bottom surface portion of this recessed plate section constitutes the outer opposite plate portion. The recessed plate section has a sectional shape as viewed in a radial direction of the bearing part, which represents, for example, a generally U-shaped configuration.

Where the recessed plate section is employed, the sensor is accommodated within the recessed plate section and sandwiched between the outer opposite plate portion, constituted by the bottom plate portion of the recessed plate section, and the inner opposite plate portion confronting the outer opposite plate portion and, therefore, the fitting of the sensor is further assured and high in reliability.

The side plate part of the sensor mounting member may have its entire circumference provided with the inner and outer opposite plate portions.

Where the inner and outer opposite plate portions are formed over the entire circumference of the side plate part, the sensor mounting member can have a simplified shape, facilitating the manufacture thereof.

The sensor mounting member may include inner and outer plates prepared from two sheet metals and overlapped one inside the other. The inner opposite plate portion and the outer opposite plate portion, both referred to above, are provided in the inner plate and the outer plate, respectively. Where the recessed plate section is to be provided, this recessed plate section is provided in the outer plate.

When the sensor mounting member is so comprised of the inner and outer plates overlapped with each other, a work of sandwiching the sensor between the inner and outer opposite plate portions of the sensor mounting member can be performed easily.

The inner and outer opposite plate portion of the sensor mounting member may have respective sensor fitting openings for allowing the sensor to pass therethrough from outside to inside, and the sensor may have a protruding part, which protrudes towards a portion or whole of an perimeter of each of the sensor fitting openings, with the protruding part sandwiched between the inner and outer opposite plate portions.

Where the inner opposite plate portion of the side plate part of the sensor mounting member is provided with the sensor fitting opening, the sensor can be opposite directly to the encoder without the intervention of the side plate part. Also, where the sensor fitting opening is provided in the outer opposite plate portion, drawing of an electric wiring to the outside can be facilitated. When those sensor fitting openings are provided, it is possible to position the sensor relative to the radial and circumferential directions of the bearing part by allowing an outer periphery of the sensor to engage the sensor fitting openings.

In the present invention, an elastic element may be interposed between the sensor and one or both of the inner and outer opposite plate portions. Where the recessed plate section is provided, the elastic element is intervened between the sensor and the outer opposite plate portion, defining a bottom plate part thereof, or the inner opposite plate portion confronting therewith.

When the elastic element is so interposed, the sensor can be stably retained by the sensor mounting member without being loosened and, also, without an excessive sandwiching force induced.

The elastic element may concurrently serve as a seal for sealing between the inner member and the sensor mounting member. By way of example, the elastic element is so constructed that an inner peripheral edge of the elastic element can slidingly engage with an outer peripheral surface of the inner member.

In such case, the elastic element can be used concurrently for the stable fitting of the sensor and a sealing means and, without increasing the number of component parts, the sealability can be increased. Also, when the elastic element is used to seal a space between the inner member and the sensor mounting member, biting of foreign matters between the encoder and the sensor is prevented and, even when the bearing device with the sensor of the present invention is applied to a wheel support bearing assembly, biting of sand particles, which results from scattering of stones from the road surface, in between the encoder and the sensor can be prevented.

Also, in the case where an outer race, which is one of coupling members of a constant velocity joint, is to be coupled with the inner member, the elastic element referred to above may have a lip part slidingly engageable with the outer race of the constant velocity joint to thereby seal an axial gap, which may be developed between the outer race and the sensor mounting member.

Where the sealing lip part is provided in the elastic element, a sealing effect can be obtained regardless of whether it is used to seal a radial gap or whether it is used to seal the axial gap. Moreover, if it is used to seal the radial gap, the lip part may often ride up during assemblage, resulting in reduction in assimilability, but if it is used to seal the axial gap, the lip part riding up during assemblage such as discussed above will hardly occur.

In the present invention, each of the encoder and the sensor may be either a magnetic type or an optical type. In the case of the magnetic type, the encoder is rendered to be a magnetic encoder formed with alternating magnetic poles deployed in a circumferential direction and the sensor may be a magnetic sensor utilizing, for example, a Hall element or a magnetoresistive element.

The bearing device with the sensor according to the present invention can be applied to any bearing device used in various field of application, for example, to a wheel support bearing assembly. In such case, the bearing part referred to previously may include the inner member having a plurality of raceways defined in the inner periphery thereof, the outer member having respective raceways confronting the raceways, and double rows of rolling elements interposed between those opposite raceways, and is operable to rotatably support a vehicle wheel relative to an automotive vehicle body.

Since the wheel support bearing assembly is placed under the severe environment tending to be exposed to vibration and also to the road surface, from which it tends to be contaminated with grits and sands, advantages of the present invention that the fitting of the sensor is assured and excellent in reliability can be exhibited effectively. Also, use to the wheel support bearing assemblies of varying size can be made easily and at a low cost.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

Figure 1A:
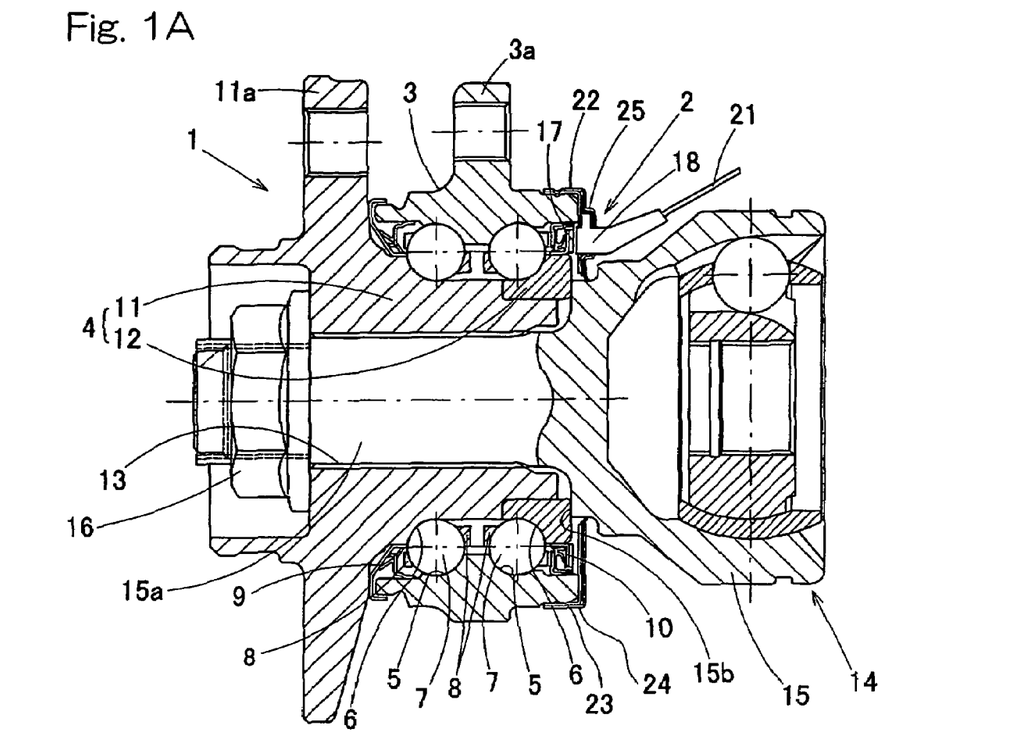
FIG. 1(A) is a longitudinal sectional view of a bearing device with a sensor according to a first preferred embodiment of the present invention, which is in the form of a wheel support bearing assembly.
Figure 1B:
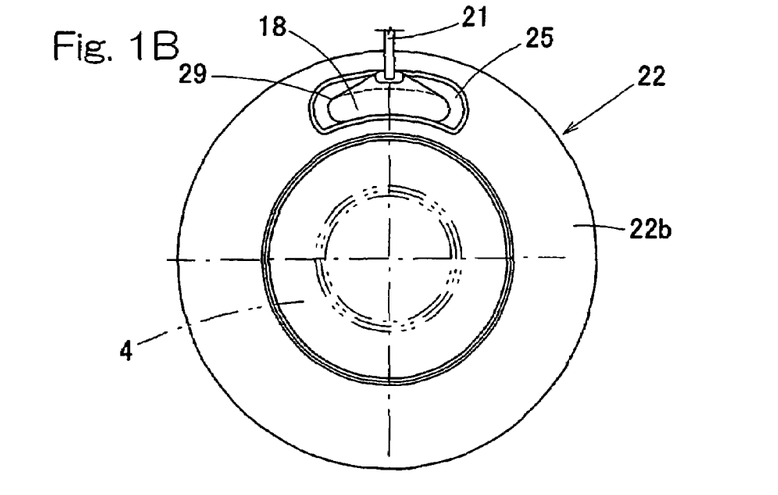
FIG. 1(B) is a front elevational view of the bearing device with the sensor of FIG. 1(A), showing a sensor mounting member and a sensor.

The first embodiment of the present invention will be described with reference to FIGS. 1 and 2. This embodiment is applied to a wheel support bearing assembly of a third generation type. This bearing device with the sensor is of a type, in which a revolution sensor part 2 is fitted to a bearing part 1 and FIG. 1(A) illustrates a constant velocity joint 14 connected thereto.

The bearing part 1 includes an outer member 3 having an inner periphery formed with a plurality of raceways 5, an inner member 4 formed with raceways 6 confronting the respective raceways 5, and double rows of rolling elements 7 interposed between the raceways 5 in the outer member 3 and the raceways 6 in the inner member 4. The rolling elements 7 of each of the double rows are retained by a corresponding retainer 8. Opposite ends of a bearing space delimited between the outer member 3 and the inner member 4 are sealed by respective seals 9 and 10.

The outer member 3 is of one-piece construction including a flange 3a provided in an outer periphery thereof, which is fitted to, for example, a knuckle in a suspension device (not shown) of an automotive vehicle body.

The inner member 4 is made up of a hub axle 11, having a wheel mounting flange 11a on an outboard end thereof, and an inner race 12 mounted on an outer periphery of an inboard end of the hub axle 11, with the raceways 6 provided respectively in the hub axle 11 and the inner race 12. It is to be noted that the term "outboard" is intended to represent an outer side in a direction widthwise of the automotive vehicle body in a condition, in which the wheel support bearing assembly is mounted on the automotive vehicle, and a side representing an inner side is represented by the term "inboard".

The inner member 4 has a center bore 13 and a stem portion 15a of an outer race 15, which serves as one of coupling members of a constant velocity joint 14, is inserted into the center bore 13. A free end of the stem 15a has a male thread part and, by fastening a nut 16 threadingly engageable with this male thread part, the constant velocity joint outer race 15 is coupled with the inner member 4. At this time, when a stepped face 15b provided in the constant velocity joint outer race 15 is urged against an end face of the inner race 12 of the inner member 4, the inner race 12 is fixed to the hub axle 11.

Figure 2:
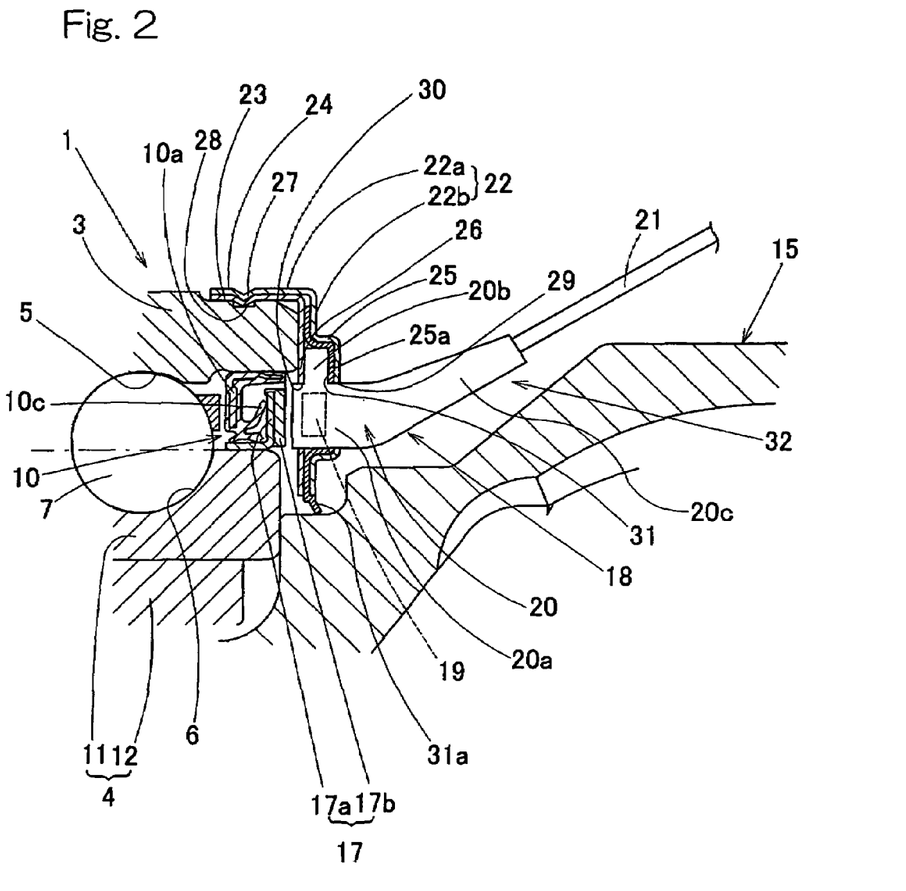
FIG. 2 is an enlarged fragmentary longitudinal sectional view of FIG. 1(A)

As shown in FIG. 2 on an enlarged scale, the revolution sensor 2 includes an encoder 17, fitted to an end outer periphery of the inner member 4, and a sensor 18 fitted to an end of the outer member 3 in face-to-face relation with the encoder 17.

The encoder 17 is in the form of a magnetic encoder and is of a type, in which a multipolar magnet 17b is provided on a side plate part of an annular core metal 17a of a L-sectioned configuration. The encoder 17 is fitted to the inner member 4 by causing a cylindrical part of the core metal 17a to be press-fitted on the outer periphery of the inner member 4. The multipolar magnet 17b is a member formed with a plurality of alternating magnetic poles N and S deployed in a circumferential direction thereof and may be in the form of a rubber magnet, plastic magnet or sintered magnet.

In the illustrated embodiment, the encoder 17 concurrently serves as a component part of the seal 10 on the inboard side and exhibits a function as a slinger. This seal 10 is made up of the core metal 17a of the encoder 17 and a sealing member 10a mounted inside an inner bore of the outer member 3. The sealing member 10a is represented by an elastic element such as, for example, rubber provided on an annular core metal, which elastic element is provided with a plurality of lip parts 10c having their free ends slidingly engaged with the side plate part and a cylindrical part of the encoder 17.

The sensor 18 is a magnetic sensor for detecting a magnetic field of the encoder 17 and is fitted to the outer member 3 through a sensor mounting member 22. The sensor 18 is of a type, in which a sensor element 19 such as, for example, a Hall element or a magnetoresistive element is embedded in a sensor holder 20 made of, for example, a resinous material. In the sensor 18, the magnetic detecting element 19 is provided in, for example, two in number in a fashion spaced in a circumferential direction, so that two pulse outputs, offset 90° in electric phase from each other, can be obtained relative to an arrangement of the magnetic poles of the encoder 17. For this reason, a body part 20a of the sensor holder 20 of the sensor 18 is rendered to represent an arcuate shape, when viewed in a front elevational view, that is concentric with a bearing center. The sensor holder 20 has a protruding part 20b extending from a portion thereof adjacent a free end of the body part 20a in a radially outward direction and is provided with a cord cover part 20c extending in a direction away from a detecting surface with its diameter progressively decreasing. A cord 21 extends from a free end of the cord cover part 20c. The protruding part 20b is rendered to protrude from the entirety of the body part 20a in a circumferential width of the bearing of the body part 20a in a radially outward direction.

The sensor mounting member 22 has a mounting tube part 22a, which is adapted to be mounted on an outside surface of the outer member 3, and a side plate part 22b axially positioned in contact with an end face of the outer member 3. This side plate part 22b is provided with inner and outer opposite plate portions 26 and 25a confronting with each other, with the sensor 18 fitted sandwiched between those inner and outer opposite plate portions 26 and 25a.

More specifically, the side plate part 22 is provided with a recessed plate section 25, having its inner surface side recessed to represent a cup-like configuration, and a bottom surface portion of this recessed plate section 25 defines the outer opposite plate portion 25a. The inner opposite plate portion 26 is a portion confronting the outer opposite plate portion 25a comprised of the bottom surface portion referred to above. The sensor 18 is, while accommodated within the recessed plate section 25, fitted sandwiched between the outer opposite plate portion 25a, comprised of the bottom surface portion of the recessed plate section 25, and the opposite plate portion 26 confronting therewith.

The recessed plate section 25 has a sectional shape along a radial direction thereof, which represents a U-sectioned configuration. More specifically, the recessed plate section 25, when viewed in a front elevational view, represents an arcuate shape extending in a direction circumferentially of the sensor mounting member 22 as shown in FIG. 1(B), and opposite ends adjacent an outer and inner peripheries of the arcuate shape are continued to each other through sides of the arcuate shape.

The sensor mounting member 22 includes two metallic plates, i.e., an inner plate 23 and an outer plate 24, which are overlapped one inside the other, and the recessed plate section 25 referred to previously is provided in the outer plate 24 while a part of the inner plate 23 defines the opposite plate portion 26 referred to previously. In the instance as shown, the inner opposite plate portion 26 is constituted by a part confronting the recessed plate section 25 of the outer plate 24 in a side plate part of the inner plate 23. Each of the inner plate 23 and the outer plate 24 is prepared from a sheet metal by the use of any press work.

Fitting of the sensor mounting member 22 to the outer member 3 is carried out by, after the mounting tube part 22a has been press-fitted onto the outside surface of the outer member 3, providing a crimped part 27 at a plurality of circumferential locations of the mounting tube part 22a. The crimped part 27 is in the form of an embossed projection and is provided for engagement with an engagement groove 28 formed in the outside surface of the outer member 3 at a location adjacent one end thereof. It is to be noted that the mounting tube part 22a may be fitted to the outer member 3 solely by means of a press-fitting.

The outer and inner opposite plate portions 25a and 26 of the sensor mounting member 22 have respective sensor fitting openings 29 and 30 defined therein for allowing the sensor 18 to extend therethrough from outside to inside, and those sensor fitting openings 29 and 30 are of a shape sufficient to fit around an outer periphery of the sensor holder body part 20a. The sensor 18 has the protruding part 20b as hereinbefore described, which protruding part 20b protrudes towards a bearing outer peripheral side beyond the respective perimeters of the sensor fitting openings 29 and 30. This protruding part 20b is sandwiched between the opposite plate portion 25a, constituted by the bottom surface portion of the recessed plate section 25, and the inner opposite plate portion 26.

In the side plate part 22b of the sensor mounting member 22, a ring-shaped elastic element 31 is sandwiched between the inner plate 23 and the outer plate 24 and this elastic element 31 intervenes between an entire inner surface of the recessed plate section 25 of the sensor mounting member 22 and the sensor 18. The elastic element 31 is in the form of, for example, a sheet-like rubber material. The elastic element 31 has a lip part 31a protruding from an inner peripheral edge of the side plate part 22b of the sensor mounting member 22, which lip part 31a has a free end slidingly engaged with an outer diametric surface of the constant velocity joint outer race 15. This lip part 31a defines a seal for sealing between the inner member 4 and the sensor mounting member 22.

According to the bearing device with the sensor of the structure described above, since the sensor is fitted in a fashion sandwiched between the opposite plate portion 25a, constituted by the bottom surface portion of the recessed plate section 25 provided in the sensor mounting member 22, and the inner opposite plate portion 26 confronting thereto, there is no risk of the sensor 18 being detached. Because of this, the fitting is assured and high in reliability. Also, since in this embodiment, the recessed plate section 25 has a sectional shape in a direction circumferentially of the bearing part, which is rendered to represent a generally U-sectioned configuration and the sensor holder body 20a of the sensor 18 is arranged in a fashion mounted inside the recessed plate section 25, an effect of positioning of the sensor 18 relative to the sensor mounting member 22 can also be obtained. Since the sensor mounting member 22 is mounted on the outer diametric surface of the outer member 3 through the mounting tube part 22a and is axially positioned in contact with the end face of the outer member 3 through the side plate part 22b, the positioning can be easily and accurately accomplished and, therefore, the precision of positioning of the sensor 18 relative to the encoder 17 can be rendered excellent. Also, since the sensor 18 is manufactured separate from the sensor mounting member 22 and is fitted to the sensor mounting member 22, it is possible to select the sensor mounting member 22 of a size suitable to the size of the bearing part 1 where it is to be fitted to one of the wheel support bearing assemblies of varying sizes. For this reason, for a given sensor 18 made up of the sensor element 19 and the sensor holder 20, the element of the same size can be used for the bearing part of the varying sizes and, accordingly, the sensor unit 32 including the sensor 18 and the sensor mounting member 22 can be manufactured at a low cost.

Since the sensor mounting member 22 is made up of the inner and outer plates 23 and 24 that are overlapped one inside the other, a work of sandwiching the sensor 18 between the generally U-shaped recessed plate section 25 and opposite plate portion 26 of the sensor mounting member 22 can easily be performed.

Since the sensor mounting member 22 has the sensor fitting openings 29 and 30 for allowing the sensor 18 to pass therethrough from outside to inside, the sensor 18 can be confronted directly with the encoder 17. Also, since the recessed plate section 25 is provided with the sensor fitting opening 30, drawing of the cord 21 to the outside can easily be accomplished. Also, since the sensor fitting openings 29 and 30 are provided, when the sensor 18 is so arranged that the outer periphery of the sensor 18 fits to those sensor fitting openings 29 and 30, the positioning of the sensor 18 in respective directions radially and circumferentially of the bearing part 1 is possible and this positioning can further be facilitated.

Since the elastic element 31 intervenes between the opposite plate portion 25a, constituted by the bottom plate part 25a of the recessed plate section 25 of the sensor mounting member 22, and the sensor 18, the sensor 18 can be stably retained by the sensor mounting member 22 without being loosened and, also, without an excessive sandwiching force induced. It is to be noted that the elastic element 31 may be intervened between the sensor 18 can be protected and the opposite plate portion 26.

Also, since the elastic element 31 is such that the lip part 31a is slidingly engaged with the outer peripheral surface of the constant velocity joint outer race 15a, a space between the inner member 4 and the sensor mounting member 22 can be sealed. For this reason, there is no possibility of foreign matters bitten between the encoder 17 and the sensor 18 and biting of sand particles, which results from scattering of stones from the road surface, in between the encoder 17 and the sensor 18 can be prevented, thereby avoiding damages to the sensor 18 and others. Also, since the sensor 18 and a portion of the encoder 17 confronting the sensor 18 are covered by the sensor mounting member 22 and the lip part 31a of the elastic element 31, protection of the encoder 17 and the detecting surface of the sensor 18 from salty mud water can be obtained.

Since the elastic element 31 concurrently serves as a stable fitting and a sealing means, the sealability can be increased with no need to increase the number of component parts.

Figure 3A:
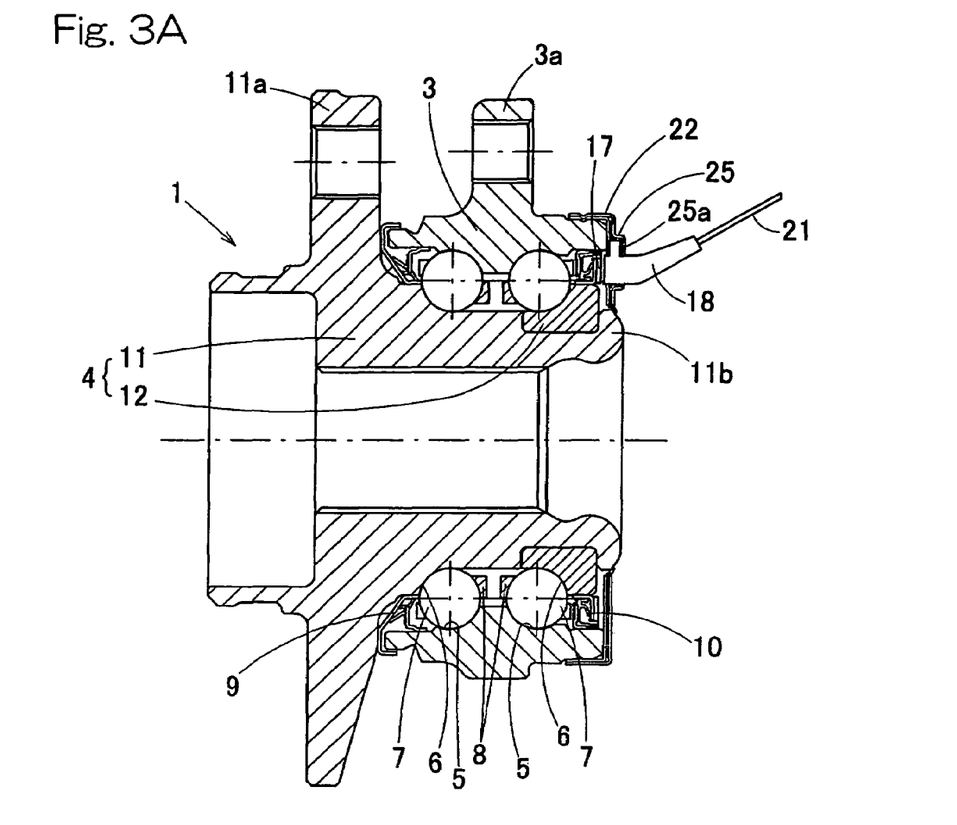
FIG. 3(A) is a longitudinal sectional view of the bearing device with the sensor according to a second preferred embodiment of the present invention, which is in the form of a wheel support bearing assembly.
Figure 3B:
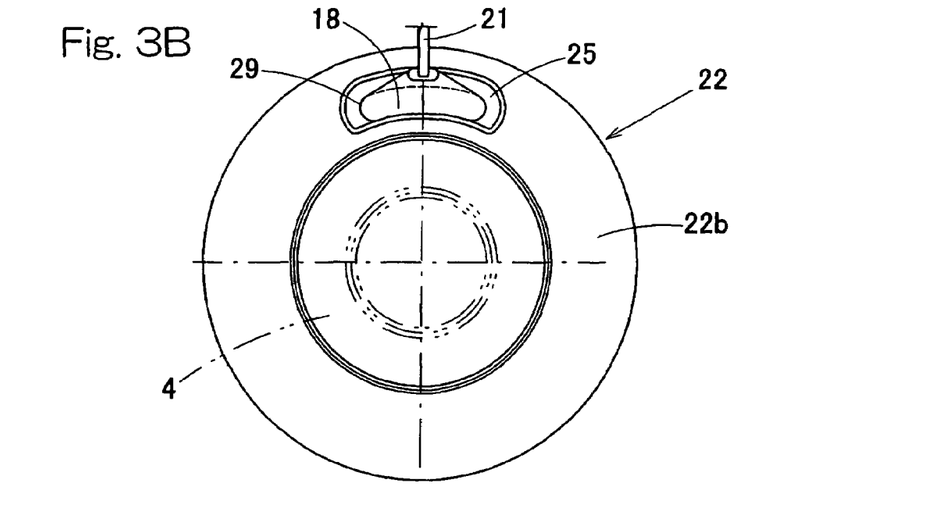
FIG. 3(B) is a front elevational view of the bearing device with the sensor of FIG. 3(A), showing the sensor mounting member and the sensor.
Figure 4:
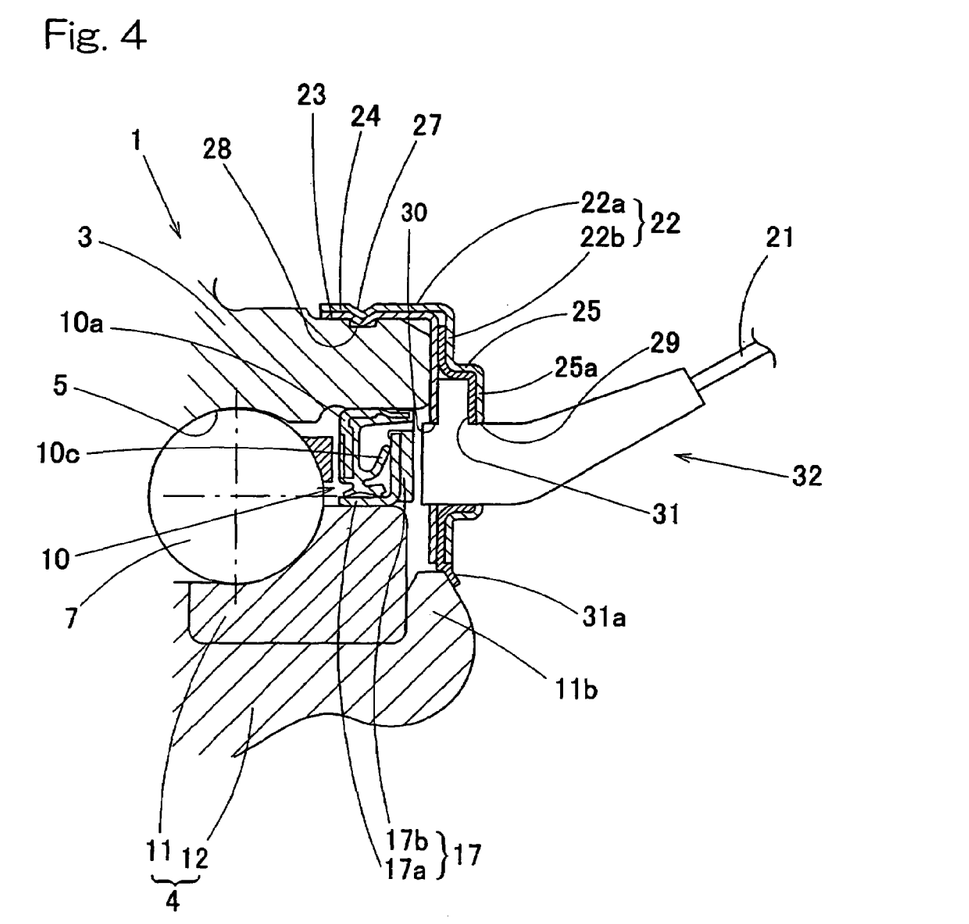
FIG. 4 is an enlarged fragmentary longitudinal sectional view of FIG. 3(A)

FIGS. 3 and 4 illustrates another preferred embodiment of the present invention. This embodiment is such that in the first embodiment described with reference to FIGS. 1 and 2, the inner race 12 mounted on the hub axle 11 is fixed to the hub axle 11 by means of a crimped portion 11b formed by curling a rear end of the hub axle 11. The lip part 31a of the elastic element 31 provided in the sensor mounting member 22 is so arranged as to slidingly engage the crimped portion 11b of the hub axle 11 in the inner member 4. It is to be noted that the lip part 31a may have its free end slidingly engageable with an end face of the inner member 4.

In the case of this construction, the contact of the lip part 31a of the elastic element 31 does not depend on the connecting condition of the constant velocity joint and fitting of the wheel support bearing assembly to the automotive vehicle body can be facilitated. Other structural features and effects of this embodiment are similar to those afforded by the first embodiment.

Figure 5A:
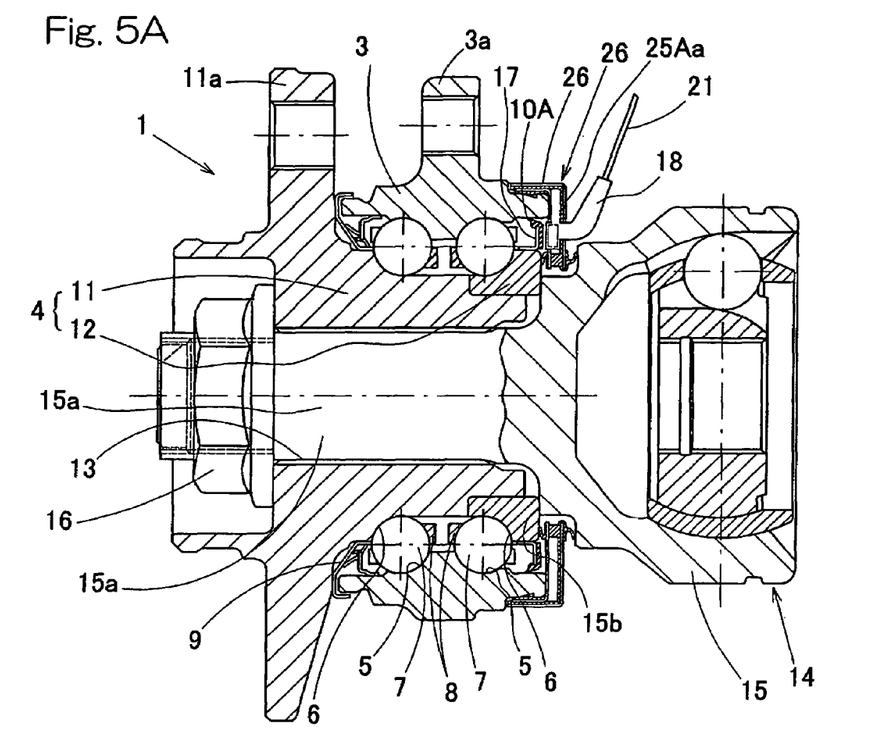
FIG. 5(A) is a longitudinal sectional view of the bearing device with the sensor according to a third preferred embodiment of the present invention, which is in the form of a wheel support bearing assembly.
Figure 5B:
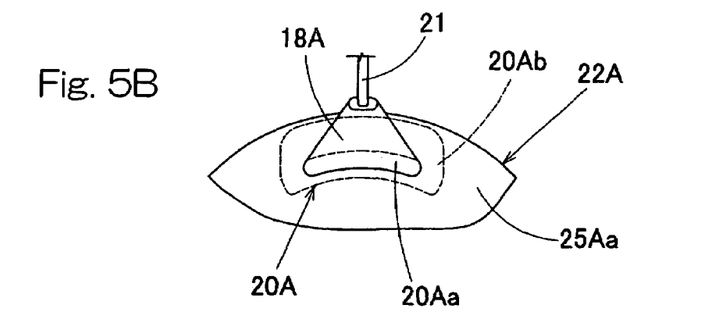
FIG. 5(B) is a front elevational view of the bearing device with the sensor of FIG. 5(A), showing the sensor mounting member and the sensor.
Figure 6:
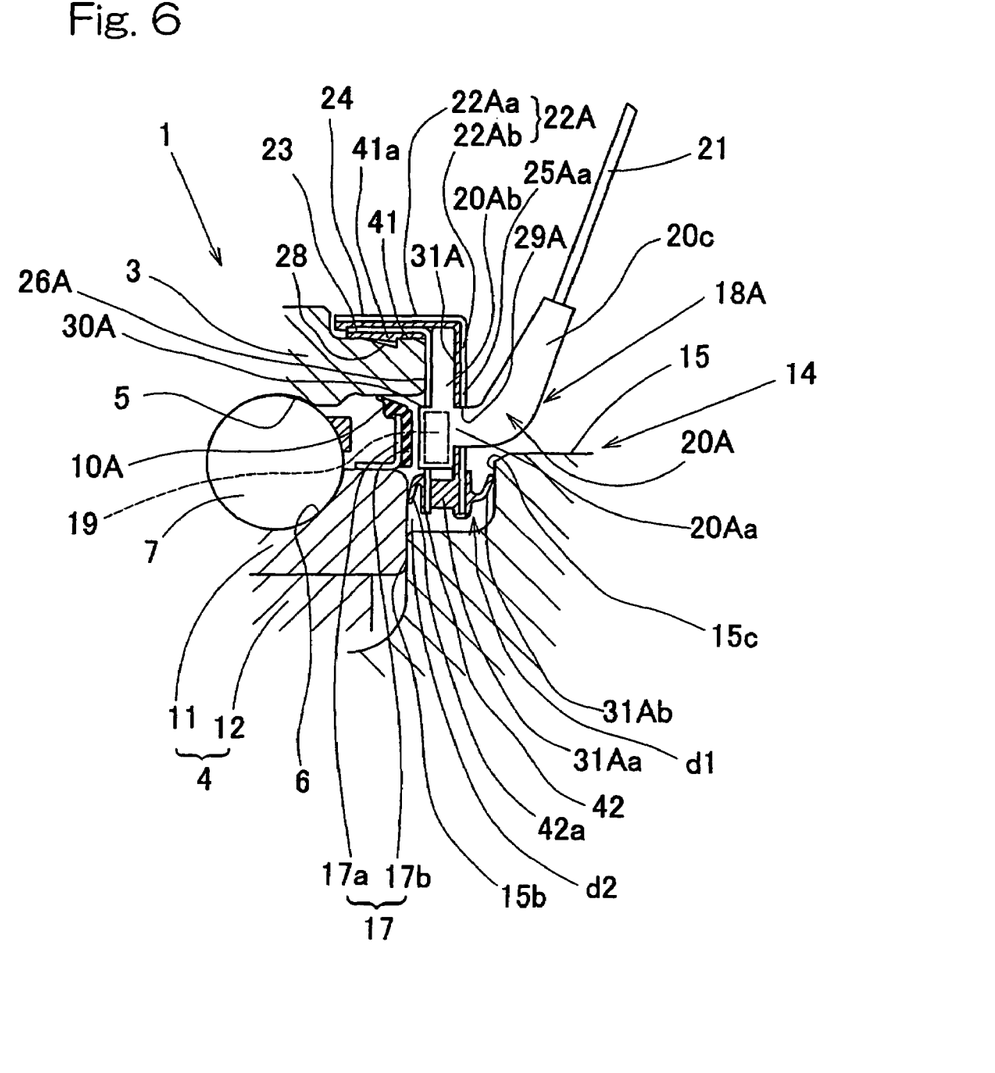
FIG. 6 is an enlarged fragmentary longitudinal sectional view of FIG. 5(A)

FIGS. 5 and 6 illustrate a third preferred embodiment of the present invention. This embodiment is such that in the bearing device with the sensor according to the first embodiment described with particular reference to FIGS. 1 and 2, the sensor mounting member 22A is so designed as to render the side plate part 22Ab thereof to have its entire circumference formed with the outer and inner opposite plate portions 25Aa and 26. The sensor 18A is fitted in a fashion sandwiched between those opposite plate portions 25Aa and 26.

The design, in which the sensor mounting member 22A has the mounting tube part 22Aa, adapted to be mounted on the outer diametric surface of the outer member 3, and the side plate part 22Ab axially positioned in contact with the end face of the outer member 3, and the use of the inner and outer metallic plates 23 and 24 overlapped with each other, are similar to those shown in and described in connection with the first embodiment of the present invention. In this embodiment, however, the inner and outer plates 23 and 24 are closely overlapped at the mounting tube part 22Aa, but have at the side plate part 22Ab a gap defined therebetween for sandwiching the sensor 18A therebetween. Each of the inner and outer plates 23 and 24 is prepared from a sheet metal by the use of any known press work.

It is to be noted that in describing this embodiment, like component parts used therein are designated by like reference numerals used in connection with the first embodiment, unless otherwise specified, while the details are not reiterated for the sake of brevity.

Fitting of the sensor mounting member 22 to the outer member 3 is carried out by press-fitting the mounting tube part 22Aa onto the outside surface of the outer member 3. The mounting tube part 22Aa has an entire inner diametric surface to which a sheet-like elastic element 41 such as, for example, a rubber sheet is fixed by bonding. A engagement projection 41a provided in an inner diametric surface of this elastic element 41 is engaged in an engagement groove 28, formed in an outer diametric surface of the outer member 3 at a location adjacent the end part thereof, to thereby enhance an effect of preventing the elastic element 41 from separating from the mounting tube part 22Aa. It is, however, to be noted that the mounting tube part 22Aa may be fitted to the outer member 3 solely by means of a press-fitting.

The outer and inner opposite plate portions 25Aa and 26A of the sensor mounting member 22A have respective sensor fitting openings 29A and 30A defined therein for allowing the sensor 18A to extend therethrough from outside to inside, and those sensor fitting openings 29A and 30A are of a shape sufficient to fit around an outer periphery of the sensor holder body part 20Aa. The sensor 18A has the protruding part 20Ab as hereinbefore described, which protruding part 20Ab protrudes towards a bearing outer peripheral side beyond the respective perimeters of the sensor fitting openings 29A and 30A. The protruding part 20Ab has a bearing outer diametric end terminating at a location adjacent the outer diametric surface of the end of the outer member 4. This protruding part 20Ab is sandwiched between the pair of the opposite plate portions 25Aa and 26A.

In the sensor mounting member 22A, a ring-shaped elastic element 31A made of, for example, rubber material is sandwiched between the inner and outer plates 23 and 24. This elastic element 31A is in the form of an elastic sheet and is, in the side plate part 22Ab, interposed between the sensor 18 and the outer opposite plate portion 25Aa. An inner peripheral edge part 31Aa of this elastic element 31A, which is positioned at an inner peripheral edge of the sensor mounting member 22A, is rendered to be a thick walled portion interposed between the outer and inner opposite plate portions 25Aa and 26 and provided for covering an outer surface of the outer opposite plate portion 26. The inner peripheral edge portion 31Aa of this elastic element 31A is provided with a lip part 31Ab slidingly engaged with a stepped face 15c that is oriented axially of the constant velocity joint outer race 15. By this lip part 31Ab, a axial gap d1 between the stepped face 15c of the constant velocity joint outer race 15 and the sensor mounting member 22A is closed. The stepped face 15c of the constant velocity joint outer race 15, with which the lip part 31Aa referred to above is slidingly engaged, is positioned at a location radially outwardly of the stepped face 15b, which is defined in the constant velocity joint outer race 15 and with which the end face of the inner race 12 of the inner member 4 is urged to contact. By those stepped faces 15b and 15c, the outer peripheral surface of the constant velocity joint 15 are formed in a stepped configuration.

The inner opposite plate portion 26A of the sensor mounting member 22A has its inner peripheral edge provided with an elastic element 42 having a lip part 42a slidingly engageable with the end face of the inner race 12 of the inner member 4 and, by this lip part 42a, an axial gap d2 delimited between an inner diametric part of the sensor mounting member 22A and the inner member 4 is closed.

As is the case with that in the first embodiment, the encoder 17 is made up of the core metal 17a of the generally L-sectioned configuration and the multipolar magnet 17b provided in this core metal 17a. The seal 10A on the inboard side is, unlike the combination seal used in the first embodiment, constituted by a lip part integral with the multipolar magnet 17b.

Other structural features of this third embodiment are similar to those in the first embodiment.

Even in this embodiment, since the sensor 18A is fitted in a fashion sandwiched between the outer and inner opposite plate portions 25Aa and 26A both provided in the sensor mounting member 22A, there is no possibility of the sensor 18A being detached. Because of this, the fitting is assured and high in reliability. Also, since the sensor mounting member 22A has, in its entire circumference, the outer and inner opposite plate portions 25Aa and 26A and since those opposite plate portions 25Aa and 26A are provided in the outer and inner plates 24 and 23, which are separate from each other, the structure is simple and the manufacture can be facilitated and a work of sandwiching the sensor 18A can also be simplified. By using the design in which the protruding part 20Ab of the sensor 18A is held in contact with an inner diametric surface of an outer peripheral tube part of the outer plate 24 at a location between the opposite plate portions 25Aa and 26A, the accuracy with which the sensor 18A is positioned radially can be enhanced.

Also, since the sensor mounting member 22A is mounted on the outer diametric surface of the outer member 3 through the mounting tube part 22Aa and is axially positioned in contact with the end face of the outer member 3 through the side plate part 22Ab, the positioning can be easily and accurately accomplished and, therefore, the precision of positioning of the sensor 18A relative to the encoder 17 can be rendered excellent. Also, since the sensor 18A is manufactured separate from the sensor mounting member 22A and is fitted to the sensor mounting member 22A, it is possible to select the sensor mounting member 22A of a size suitable to the size of the bearing part 1 where it is to be fitted to one of the wheel support bearing assemblies of varying sizes. For this reason, for a given sensor 18A made up of the sensor element 19 and the sensor holder 20A, the element of the same size can be used for the bearing part of the varying sizes and, accordingly, the sensor unit 32 including the sensor 18a and the sensor mounting member 22A can be manufactured at a low cost.

With respect to the seal between the sensor mounting member 22A and the constant velocity joint outer race 15, since the lip part 31Ab slidingly engageable in the axial gap is employed, unlike the radial type, there is no problem associated with the rise up of the lip part 31Ab during assemblage, resulting in high assimilability.

Figure 7:
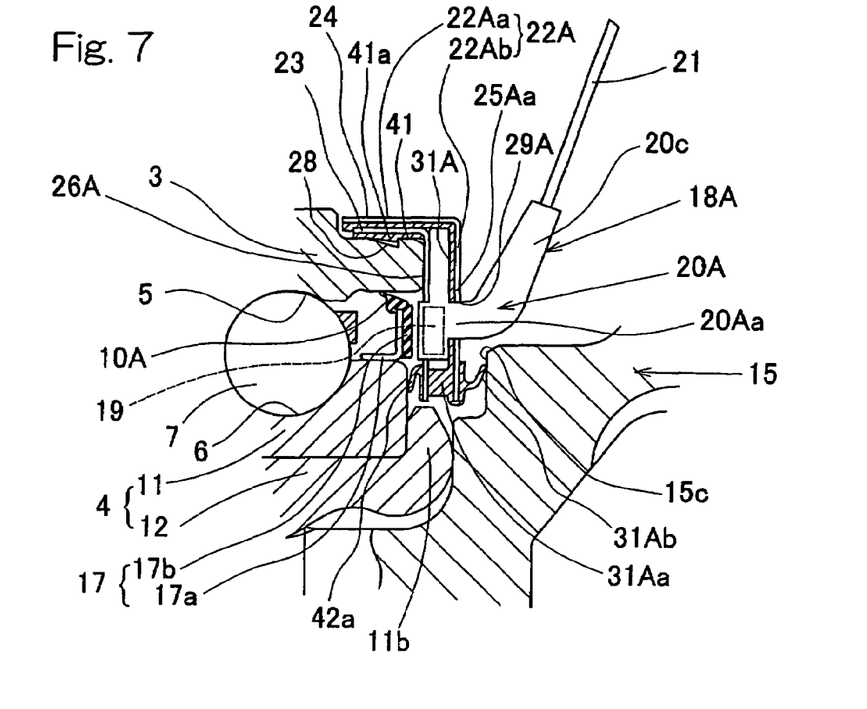
FIG. 7 is a fragmentary longitudinal sectional view showing a different relation between the sensor mounting member in the third embodiment of the present invention and a constant velocity joint.

It is to be noted that in the embodiment shown in and described with reference to FIGS. 5 and 6, the inner race 12 of the inner member 4 has been shown and described as fixed in position urged to contact the stepped face 15b of the constant velocity joint outer race 15. However, as shown in FIG. 7, the inner race 12 of the inner member 4 may be fixed in position by means of a crimped portion 11c provided in the hub axle 11. Even in such case, the sensor mounting member 22A, the sensor 18A and the encoder 17 can be constructed in a manner similar to those shown in and described with reference to FIGS. 5 and 6.

Figure 8:
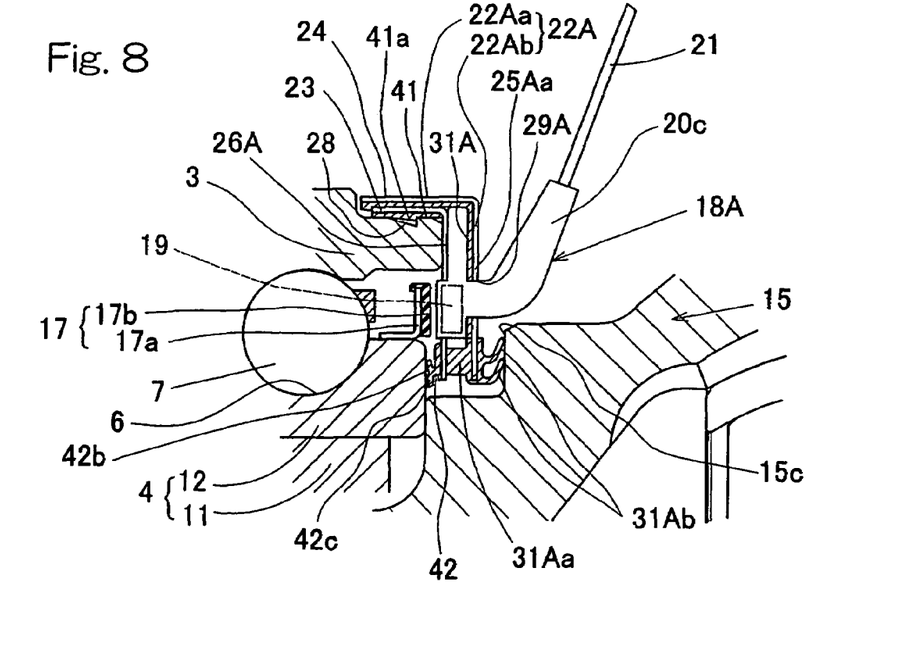
FIG. 8 is a fragmentary longitudinal sectional view showing a further different relation between the sensor mounting member in the third embodiment of the present invention and a constant velocity joint.

Also, in the embodiment shown in and described with reference to FIGS. 5 and 6, instead of the use of the seal 10A that is integral with the encoder 17, the elastic element 42 provided in the inner peripheral edge of the sensor mounting member 22A may have inwardly and outwardly oriented lip parts 42b and 42c as shown in FIG. 8, to thereby enhance the sealing effect at that portion.

It is to be noted that although any of the foregoing embodiments has been described as applied to the wheel support bearing assembly, the present invention can be applied to any radial rolling bearing in general of a type having the revolution sensor.

Also, although in any one of the foregoing embodiments, the encoder 17 and the sensor part 18 have been described as a magnetic type, they may be an optical type.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A bearing device with a sensor, comprising:
    a bearing part including an outer member having a raceway defined in an inner periphery thereof;
    an inner member having a raceway confronting the raceway in the outer member;
    rolling elements interposed between those raceways;
    a revolution sensor part including an encoder, fitted to one end of the inner member;
    a sensor fitted to one end of the outer member in face-to-face relation with the encoder; and
    a sensor mounting member,
    wherein the sensor mounting member comprises
        a mounting tube part mountable on an outer diametric surface of the outer member,
        a side plate part axially positioned in contact with an end face of the outer member,
        the side plate part of the sensor mounting member includes inner and outer opposite plate portions confronting axially with each other, and
        the sensor is sandwiched between the inner and outer opposite plate portions,
        wherein the side plate part of the sensor mounting member has its entire circumference provided with the inner and outer opposite plate portions.

2. The bearing device with the sensor as claimed in claim 1, wherein the side plate part of the sensor mounting member includes a recessed plate section having its inner surface recessed, and a bottom surface portion of the recessed plate section constitutes the outer opposite plate portion.

3. The bearing device with the sensor as claimed in claim 1, wherein the sensor mounting member comprises inner and outer plates prepared from a sheet metal and overlapped one inside the other, and
    the inner and outer opposite plate portions are provided in the inner and outer plates, respectively.

4. The bearing device with the sensor as claimed in claim 1, wherein the inner and outer opposite plates of the sensor mounting member have respective sensor fitting openings defined therein for the sensor to extend therethrough from outside to inside, and
    the sensor includes a protruding part, which protrudes towards a portion or whole of an perimeter of each of the sensor fitting openings and which is sandwiched between the inner and outer opposite plates.

5. The bearing device with the sensor as claimed in claim 1, further comprising an elastic element interposed between the sensor and one or both of the inner and outer opposite plates.

6. The bearing device with the sensor as claimed in claim 5, wherein the elastic element concurrently serves as a seal to seal between the inner member and the sensor mounting member.

7. The bearing device with the sensor as claimed in claim 5, wherein the elastic element has a lip part slidingly engageable with an outer race of a constant velocity joint, which is coupled with the inner member, to thereby close an axial gap developed between the outer race of the constant velocity joint and the sensor mounting member.

8. The bearing device with the sensor as claimed in claim 1, wherein the encoder is a magnetic encoder formed with alternating magnetic poles deployed in a circumferential direction and the sensor is a magnetic sensor.

9. The bearing device with the sensor as claimed in claim 1, wherein the bearing part includes the outer member having a plurality of raceways defined in the inner periphery thereof, the inner member having respective raceways confronting the raceways in the outer member, and a plurality of rows of rolling elements interposed between those opposite raceways, and which is operable to rotatably support a vehicle wheel relative to an automotive vehicle body.

* * * * *

UNITED STATES PATENT AND TRADEMARK OFFICE
CERTIFICATE OF CORRECTION

PATENT NO. : 7,547,145 B2 Page 1 of 1
APPLICATION NO. : 11/515942
DATED : June 16, 2009
INVENTOR(S) : Ken Yamamoto It is certified that error appears in the above-identified patent and that said Letters Patent is hereby corrected as shown below:

On the Title Page delete Item (63) and insert Item (63):

Related U.S. Application Data

(63) --Continuation-in-part of application No. 10/589,202, filed on Aug. 11, 2006, now abandoned and claims benefit of U.S. patent application Ser. No. 10/589,202, filed Aug. 11, 2006, PCT International Application No. PCT/JP2005/001879, filed Feb. 9, 2005--.

On the Title Page insert Item (30)

Foreign Priority Application Data

(30) --February 17, 2004     (JP)..........................2004-039201--.

Column 1, Line 9, change "POT" to --PCT--.

Signed and Sealed this

Twenty-sixth Day of January, 2010

David J. Kappos
*Director of the United States Patent and Trademark Office*